United States Patent
Schneider (10) Patent No.: US 8,180,736 B2
(45) Date of Patent: May 15, 2012

(54) METHODS FOR IMPROVING FILE SYSTEM PERFORMANCE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 742 days.

(21) Appl. No.: 12/201,960

(22) Filed: Aug. 29, 2008

(65) Prior Publication Data

US 2010/0057791 A1    Mar. 4, 2010

(51) Int. Cl.
*G06F 17/00* (2006.01)
(52) U.S. Cl. ........................................ 707/649; 707/718
(58) Field of Classification Search .................. 707/649, 707/718; 709/231
See application file for complete search history.

(56) References Cited

U.S. PATENT DOCUMENTS

| | | | |
|---|---|---|---|
| 7,437,528 B1 * | 10/2008 | Moore et al. | 711/170 |
| 2008/0005141 A1 * | 1/2008 | Zheng et al. | 707/101 |
| 2008/0005205 A1 * | 1/2008 | Rajakarunanayake | 707/205 |
| 2008/0077762 A1 * | 3/2008 | Scott et al. | 711/170 |

* cited by examiner

*Primary Examiner* — Belix M Ortiz
(74) *Attorney, Agent, or Firm* — Lowenstein Sandler PC (57) ABSTRACT

Techniques for managing inodes of a file system are described herein. According to one embodiment, in response to a request received at the file system for committing a file to a storage, a first indirect block having multiple entries is allocated. At least one entry stores a pointer linked with a data block, where the first indirect block is referenced by a pointer stored within an inode associated with the file. A first set of data blocks having a first predetermined number of data blocks is allocated, where each entry is referenced by a pointer stored in an entry of the first indirect block. The first indirect block and the first set of data blocks are contiguous blocks with respect to each other, such that content of the first indirect block and the first set of data blocks can be retrieved via a single storage access operation.

21 Claims, 8 Drawing Sheets

FIG. 1
(Prior Art)

Copyright (C) 1992, 1993, 1994, 1995
Remy Card (card@masi.ibp.fr)

Laboratoire MASI - Institut Blaise Pascal Universite Pierre et Marie Curie (Paris VI)
from linux/include/linux/minix_fs.h Copyright (C) 1991, 1992, Linus Torvalds

```
struct ext2_inode {
        __le16 i_mode; /* File mode */
        __le16 i_uid; /* Low 16 bits of Owner Uid */
        __le32 i_size; /* Size in bytes */
        __le32 i_atime; /* Access time */
        __le32 i_ctime; /* Creation time */
        __le32 i_mtime; /* Modification time */
        __le32 i_dtime; /* Deletion Time */
        __le16 i_gid; /* Low 16 bits of Group Id */
        __le16 i_links_count; /* Links count */
        __le32 i_blocks; /* Blocks count */
        __le32 i_flags; /* File flags */
        union {
                struct {
                        __le32 l_i_reserved1;
                } linux1;
                struct {
                        __le32 h_i_translator;
                } hurd1;
                struct {
                        __le32 m_i_reserved1;
                } masix1;
        } osd1; /* OS dependent 1 */
        __le32 i_block[EXT2_N_BLOCKS];/* Pointers to blocks */
        __le32 i_generation; /* File version (for NFS) */
        __le32 i_file_acl; /* File ACL */
        __le32 i_dir_acl; /* Directory ACL */
        __le32 i_faddr; /* Fragment address */
        union {
                struct {
                        __u8 l_i_frag; /* Fragment number */
                        __u8 l_i_fsize; /* Fragment size */
                        __u16 i_pad1;
                        __le16 l_i_uid_high; /* these 2 fields */
                        __le16 l_i_gid_high; /* were reserved2[0] */
                        __u32 l_i_reserved2;
                } linux2;
                struct {
                        __u8 h_i_frag; /* Fragment number */
                        __u8 h_i_fsize; /* Fragment size */
                        __le16 h_i_mode_high;
                        __le16 h_i_uid_high;
                        __le16 h_i_gid_high;
                        __le32 h_i_author;
                } hurd2;
                struct {
                        __u8 m_i_frag; /* Fragment number */
                        __u8 m_i_fsize; /* Fragment size */
                        __u16 m_pad1;
                        __u32 m_i_reserved2[2];
                } masix2;
        } osd2; /* OS dependent 2 */
};
```

METHODS FOR IMPROVING FILE SYSTEM PERFORMANCE

RELATED APPLICATIONS

This application is related to a co-pending U.S. patent application Ser. No. 12/201966, entitled "File System with Flexible Inode Structure," filed Aug. 29, 2008.

TECHNICAL FIELD

The present invention relates generally to file systems. More particularly, this invention relates to methods for improving file system performance.

BACKGROUND

The space in a typical file system such as second extended (ext2) file system is split up in blocks, and organized into block groups, analogous to cylinder groups in the Unix File System. Each block group contains a superblock, the block group bitmap, inode bitmap, followed by the actual data blocks. The superblock contains important information that is crucial to operations of the file system, thus backup copies are made in every block group of each block in the file system. The group descriptor stores the value of the block bitmap, inode bitmap and the start of the inode table for every block group and these, in turn are stored in a group descriptor table.

Figure 1:
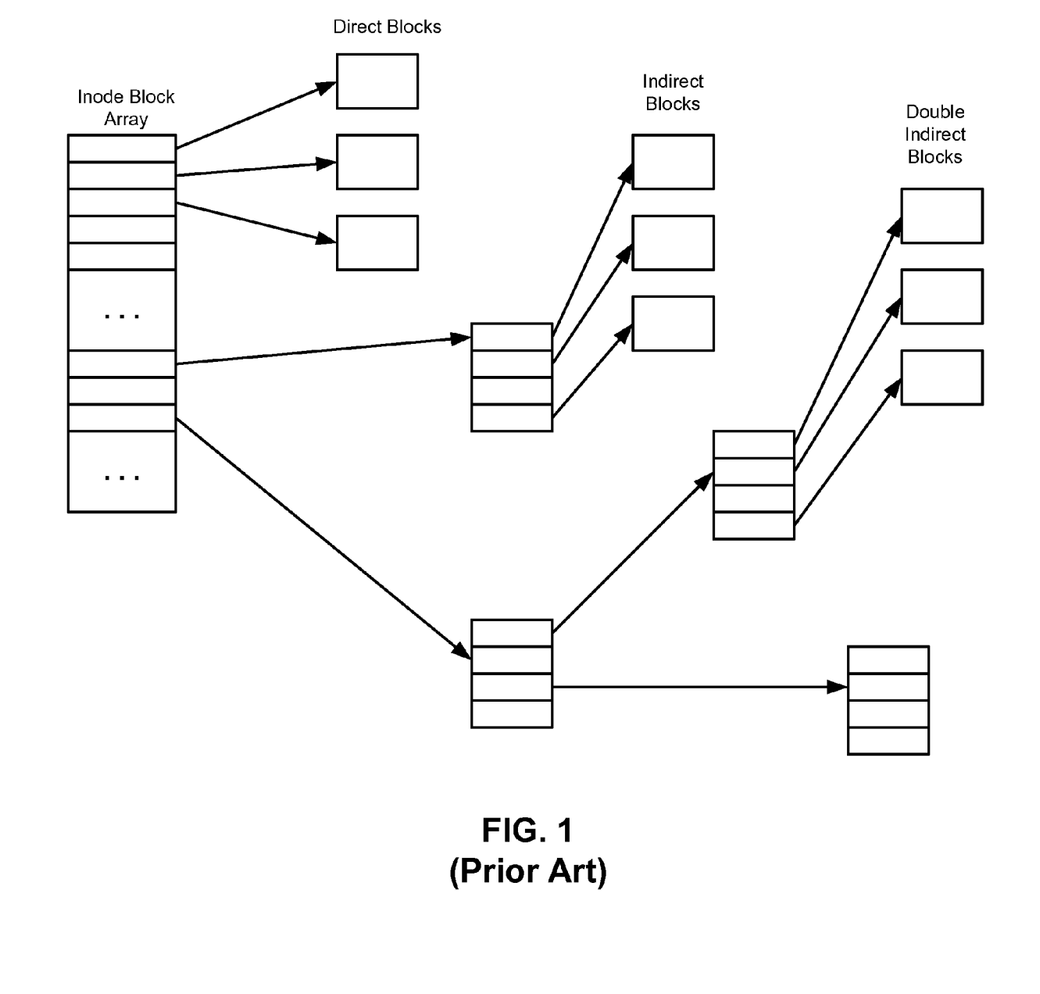
FIG. 1 shows a typical inode architecture of a file system.

When a file system is created, data structures that contain information about files are created. Each file has an inode and is identified by an inode number in the file system where it resides. An inode is a data structure on a file system on Linux and other Unix like operating systems that stores all the information about a file except its name and its actual data. FIG. 1 shows an example of ext2 inode architecture and FIG. 2 shows an example of an inode data structure.

As shown in FIG. 2, an inode data structure includes an i_block array for storing entries or links pointing to the corresponding data blocks as shown in FIG. 1. The first 12 entries in this array point directly at the data blocks for a file. The next three entries point to blocks that contain block pointers. The first of these, the "indirect block", contain pointers to the next several blocks of the file. The next one contains pointers to blocks that themselves contain pointers to the next several blocks of the file. The final entry contains a block that contains pointers to blocks that contain pointers to blocks that contain pointers to blocks of data.

Typically, a file system such as ext2 allocates based on block groups, and does not enforce any relationship between block allocations (although it does try to allocate all of the blocks for a particular file within the same block group as the file's inode).

Reading a very large file may require multiple reads just to find out where the data for the file is stored, and there's no constraint to allocate these blocks in any particular relationship to one another, so they may become scattered all over the disk. The default Linux file system (ext2) uses block groups to keep the contents of a file together, and tries to allocate the data blocks for a file within the same block group as its inode (the map that file system uses to find the data blocks for the file), but this is not always successful.

In addition, the standard practice for UNIX-type file systems is to store almost all of the information about a file in an inode data structure. This data structure contains, among other things, the file's owner and permissions information, size, type, update and access times, and the start of a map of the data blocks that hold the data for the file, as well as pointers to the remainder of that map. The collection of inodes is stored as a fixed-sized linear array, near the beginning of the file system. This makes inode operations very fast and robust, but it does introduce a few inefficiencies.

First, all inodes are the same size, and optimized for small files. Very small files (less than 10 k) waste space in the i_block array, since they have so few blocks. Very large files (larger than 64M) require a three-level lookup to find all of their data blocks, and since the blocks used to perform this lookup have no enforced location in relation to the actual file data blocks, or the inode table itself, just finding a single block near the end of a large file may require reading four blocks from all over the file system, and since they have to be read in sequence (since one block contains a pointer to the next block), the read operation cannot be parallelized across a redundant disk array.

Plus, the number of inodes is fixed at the time the file system is created. There are tools that let a user add inodes to an existing file system, but they require a manual process. A user cannot remove excess inodes from a file system without rebuilding the file system from scratch. It either winds up with too many inodes, which wastes space, or not enough, which makes it impossible to create new files, even if there are unallocated blocks on the file system.

BRIEF DESCRIPTION OF THE DRAWINGS

The present invention is illustrated by way of example and not limitation in the figures of the accompanying drawings in which like references indicate similar elements.

FIG. 2 shows a typical inode data structure used in a file system.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, the basic idea is to coordinate the allocation of inode map blocks and the file blocks themselves so that the file system drivers can usually read all of them contiguously. For illustration purposes, the ext2 file system is utilized and the ext2 inode structure is analyzed through out this application. However, other types of operating systems and data structures may also be applied.

Figure 3:
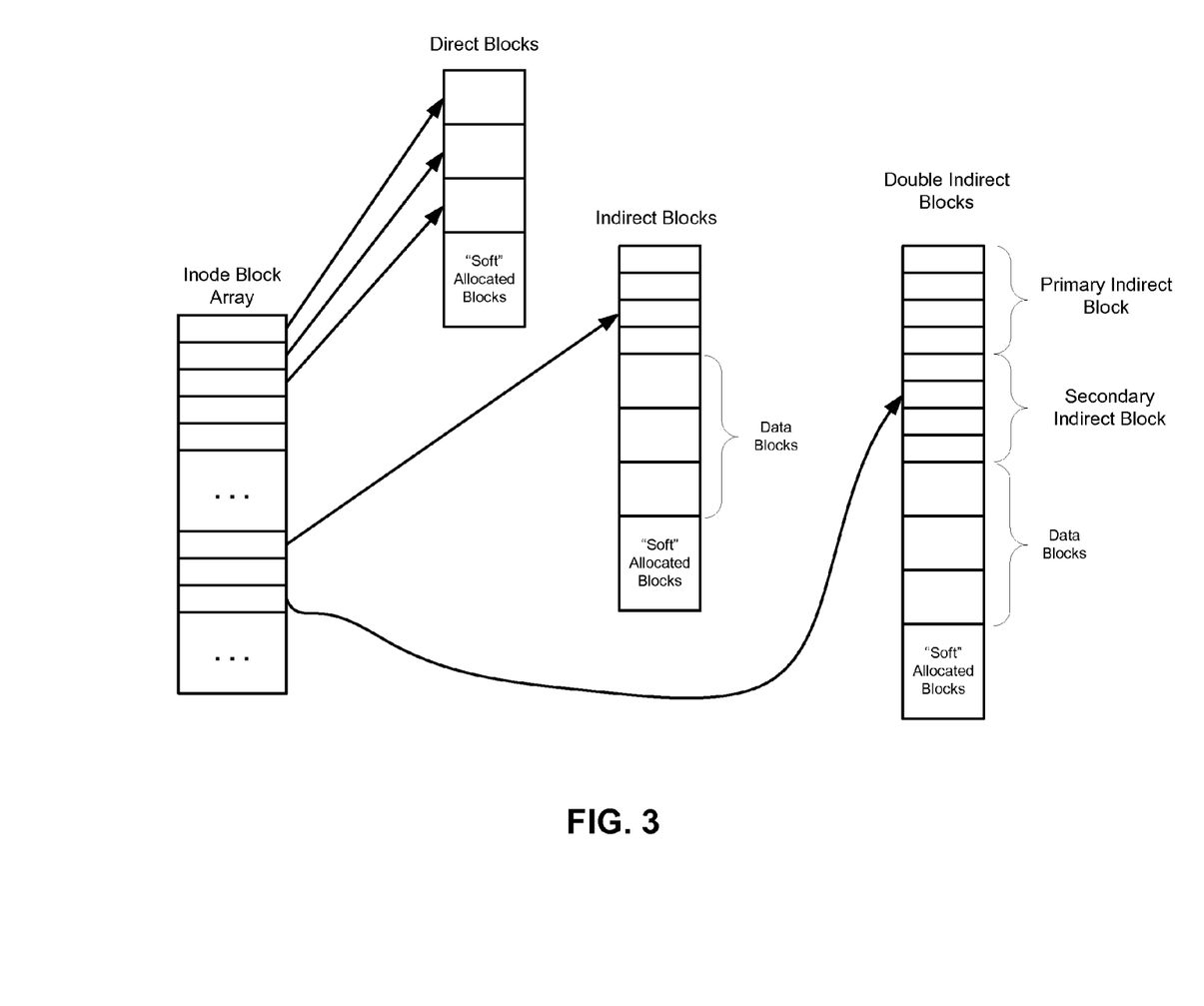
FIG. 3 is a block diagram illustrating an inode architecture according to one embodiment of the invention.

FIG. 3 is a block diagram illustrating an example of a file system according to one embodiment of the invention. According to one embodiment, when a block, either a direct block or an indirect block is allocated, a certain amount of contiguous blocks (also referred to as "soft" allocated blocks as shown in FIG. 3) immediately after the block being allocated are also allocated. As a result, a single read access to a storage such as a disk can retrieve both the leading block (e.g., indirect block) and the subsequent contiguous data blocks. The file system can then access the retrieved data blocks using the leading block or indirect block without having to perform multiple disk accesses.

For example, when the first byte of a file is committed to a disk, the file system "soft" allocates 12 contiguous blocks for that file, and only reuses those blocks when absolutely necessary. The term of "soft" allocation is that they are not actually allocated to the file yet, but as long as the file system does not get too full, these blocks will be available when the file needs them.

When an indirect block is allocated, the file system "soft" allocates as many contiguous blocks as would be mapped by the indirect block. The number of blocks to be allocated in this case would depend on the word size and block size of the system. For example, on a 32-bit system with 4 k blocks, this would be 1024 blocks, or 4 MB; on a 64-bit system with 1 k blocks, this would only be 128 blocks, or 128 k.

When a double indirect block is allocated (e.g., this block contains pointers to blocks that have pointers to the data blocks, also referred to as a primary indirect block as shown in FIG. 3), immediately after it, the file system allocates the first block pointed to by the double indirect block (e.g., secondary indirect block), and "soft" allocates as many contiguous blocks as would be mapped by that block.

When the triple indirect block is allocated (e.g., pointers to blocks containing pointers to blocks containing pointers), the next two contiguous blocks get allocated to the blocks map for this file, followed by a "soft" allocation of as many contiguous blocks as would be mapped by an indirect mapping block, and so on. When another indirect block is allocated, it should be followed by a soft allocation of as large an extent as can be mapped by the block.

According to one embodiment, the block size is specified as a power of 2 bytes (for example, a 1 k block size would be specified as 10, while a 4 k block size would be specified as 12). Assuming the global file system accounting information was available in a structure named fsa, and fsa has a property named blocksize_bits which holds this power of 2 value, the number of blocks that can be allocated from a single indirect block would be 1<<(fsa→blocksize_bits-2) on a file system with 32 bit block numbers, and 1<<(fsa→blocksize_bits-3) on a file system with 64 bit block numbers. The "<<" operator is the C/C++ left shift operator; it has the effect of multiplying its left hand side by the power of two specified by its right hand side (for example, 1<<3 is 1*2^3=8, and 3<<4 is 3*2^4=48).

By following an indirect block immediately by the first block its allocation controls in all cases, the first entry can be designated in every indirect block for another use. This now-surplus word can now be used to track the "soft" allocations by modifying the allocation method used by the file system.

UNIX-type file systems originally tracked blocks that were not allocated to any file by creating a list of these blocks known as the "free list" or "free block list". There were several implementations, but one of the most common was to take a free block, fill it with pointers to other free blocks, and use the last block pointer as a pointer to the next block in a chain. So, for example, if blocks 1000-9000 were free, and the blocks could each hold 256 entries, block #1000 would contain pointers to 1001-1256, block 1256 would point to blocks 1257-1512, etc. The first entry in an indirect block could be used to point to a free list of the blocks available in the "soft" allocation (and, simultaneously, the current allocation method for blocks in the file system would show these blocks as allocated, and only search the soft allocations when an allocation can't be satisfied any other way).

For example, in one common practice, some of the blocks that are not currently allocated to a file are used to track the other blocks that are not currently allocated to a file. These blocks make up what is known as the "free list". For example, if blocks 12,001-14,008 are free on a system that uses 4 k blocks and 32 bit block numbers, the free list would look something like this:

block 12,001:
Free blocks array (containing 12,002, 12,003, . . . 13,023)
pointer to next block in the free list (13,024)
block 13,024:
Free blocks array (containing 13,025, 13,026, . . . 14,008)

As blocks are allocated, the corresponding entry in the free list block is zeroed out. When the block is entirely filled with zeros, it is the next block to get allocated (or it gets added to another block at the end of the free list).

The initial 12-block "soft" allocation for small files could be tracked by sticking the block numbers that are soft allocated directly into the inode block table, and relying on the size of the file to let the file system know how many blocks actually need to be read.

Note that there would be no modification to the inode block table itself, just to the interpretation of the first 12 entries in the i_block[ ] array of an inode data structure as shown in FIG. 2, and to how they get populated in the first place. Instead of the operating system filling the entries in one at a time, as blocks get allocated to the file, all of them would get populated when the first data block is committed to the file. File operations would just need to be aware of the file size to determine if a block were actually in use.

For example, if a block #12,345 were allocated to a file, and that was the only allocated block, the i_block[ ] array would contain an entry with the value 12,345, followed by 14 zero entries. The difference with this technique is the file system would be scanned for a set of 12 contiguous free blocks, and the i_block[ ] array would be filled with their consecutive block numbers. For example, if the first block were 12,345, the i_block[ ] array would get the values 12,345, 12,346, 12,347, 12,348, 12,349, 12,350, 12,351, 12,352, 12,353, 12,354, 12,355, and 12,356 (plus three zeros for the indirect block entries). The blocks would also be marked as allocated in the allocation bitmap, or removed from the free list (depending on the precise details of the file system).

This system may require some modifications to be used with ext2—in particular, the ext2 block group layout relies on having an even power of two blocks in a block group, while this method will always allocate 1, 2, or 3 more blocks than an even power of two (neglecting the initial "soft" allocation of 12 blocks). So, the last "soft" allocation in a particular block group may wind up being short.

Figure 4:
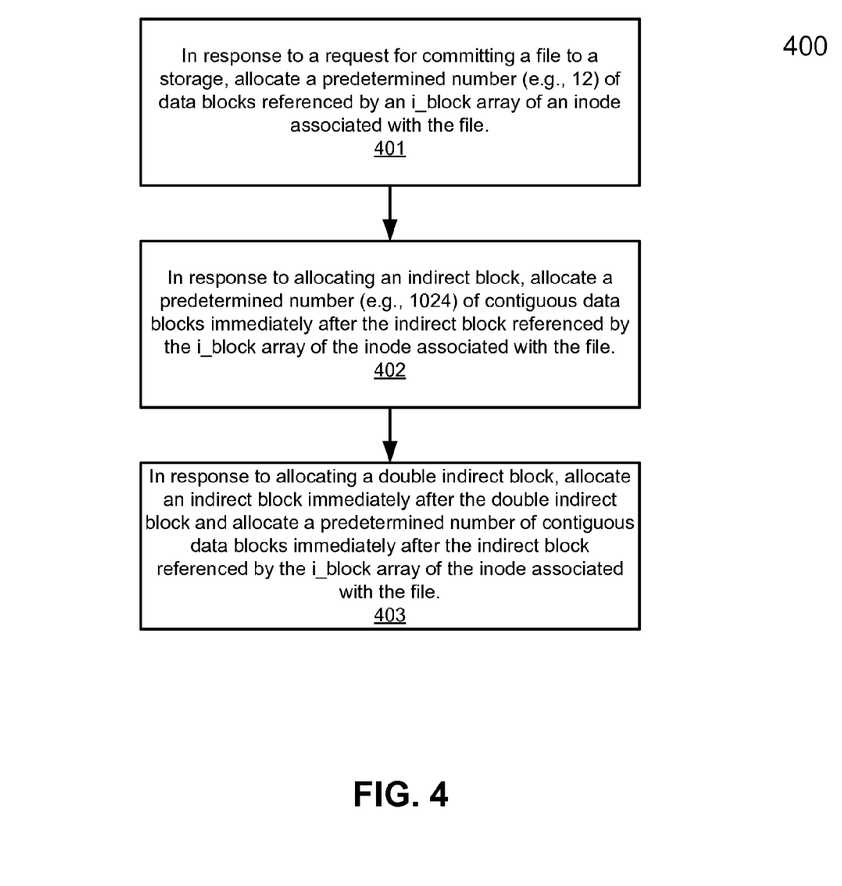
FIG. 4 is a flow diagram illustrating a process for allocating data blocks in a file system according to one embodiment of the invention.

FIG. 4 is a flow diagram illustrating a process for allocating data blocks in a file system according to one embodiment of the invention. Note that process 400 may be performed by processing logic which may include software, hardware, or a combination of both. Referring to FIG. 4, in response to a request for committing a file to a storage (e.g., disk), at block 401, a predetermined number of contiguous data blocks are allocated and referenced by a block array of an inode associated with the file. In response to a allocating an indirect block, at block 402, a predetermined number of contiguous data blocks are allocated immediately after the indirect block referenced by the block array element of the inode data structure associated with the file. In response to allocating a double indirect block, at block 403, an indirect block is allocated immediately after the double indirect block and a predetermined number of contiguous data blocks are also allocated immediately after the indirect block referenced by the block array element of the inode data structure associated with the file. As a result, the indirect block (e.g., single indirect or double indirect block) as well as the data blocks can be retrieved via a single disk access. Other operations may also be performed.

As described above, one of the advantages of embodiments of the invention is that the file can be read in larger chunks. By soft allocating the first 12 blocks, the file system can read the first 12 blocks with a single disk operation on most modern hardware. By enforcing a policy of always allocating data blocks directly after the indirect blocks that control them, the file system can read both the indirect block(s) and a good chunk of the file both in one disk operation. In contrast, with a conventional file system, data blocks may or may not be contiguous to the indirect block(s) that manage them.

As described above, the standard practice for UNIX-type file systems is to store almost all of the information about a file in an inode data structure. This data structure contains, among other things, the file's owner and permissions information, size, type, update and access times, and the start of a map of the data blocks that hold the data for the file, as well as pointers to the remainder of that map. The collection of inodes is stored as a fixed-sized linear array, near the beginning of the file system. This makes inode operations very fast and robust, but it does introduce a few inefficiencies as described above.

Figure 5:
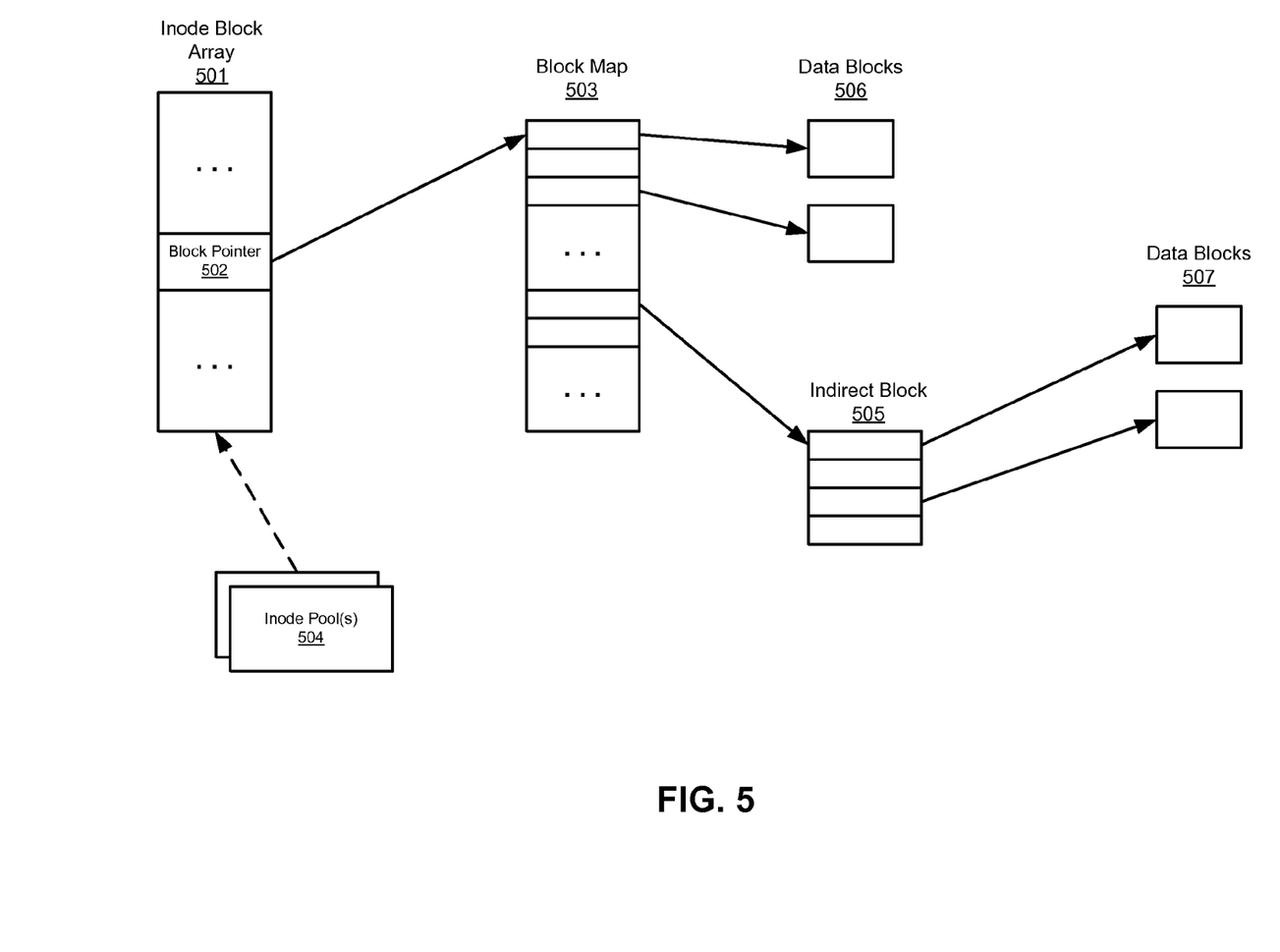
FIG. 5 is a block diagram illustrating an example of inode structure according to one embodiment.

According to certain embodiments, the inode data structure is modified to have a flexible structure. FIG. 5 is a block diagram illustrating an example of inode structure according to one embodiment. Referring to FIG. 5, in one embodiment, within the inode data structure 501, the information that tracks the location of the file contents is split from the rest of the information in the inode. Instead of having 15 block addresses that point to bits of the file, or to blocks that point to bits of the file, a single index 502 is utilized pointing to a block map 503 which stores pointers to data blocks 506 or indirect blocks 505-507. Note that multiple block maps can be aggregated into a block maps table.

In this example, the main difference between the conventional practice of inode structure and this embodiment is the i_block[ ] array as shown in FIG. 2. In this embodiment, such an i_block[ ] array is replaced with a single pointer 502 pointing to a block map 503 (and possibly a table indicator, although the OS should be able to determine which table is in use by examining the size of the file). The chief advantage is that it removes what should really be a variable sized structure from right in the middle of what is a fixed sized structure.

In addition, according to another embodiment, the inodes are organized into two or more inode pools 504. When one inode pool is full, a new one is allocated. When an inode pool only contains deleted inodes (e.g., inodes for files that have been deleted) and there are free inodes in another pool, the pool is deallocated. As described above, the conventional approach is to allocate a fixed array of inodes when the file system is created. This embodiment would create pools of inodes as they are needed. Note that the pools can contain a variable number of inodes, but performance would be better if there were a fixed number of inodes per inode pool, and that an inode pool was allocated entirely from a single contiguous extent of blocks.

Further, according to another embodiment, the structures that manage the allocation of data blocks are organized in a way that reflects the size of the file being managed—a "small", "medium" and "large" allocation map strategy (with an optional "huge" entry), with a way to move a block map from one group to an adjacent group (for example, when a "small" file becomes a "medium" file).

For example, a "small" file would be one that is 16 blocks or smaller (on a system with a 4 k block size, that would be 64 k). A "medium" file would be one that can be referenced with 16 indirect blocks (on a 32 bit system with 4 k blocks, that would be 16 k blocks, or 64M). A "large" file would be one that can be referenced with 16 double indirect blocks (16M blocks, or 64 G). If a user needs a file system that supports larger files, 16 triple indirect blocks can support files of 16 T on a 32 bit system with 4 k blocks (would actually be a little bit less—a 32 bit system with 4 k blocks can only support a total of 16 T in a single file system, which has to include not only file data, but all of the metadata required to keep track of the file system itself).

For performance reasons, each distinct map type may be stored in its own table. When a file outgrows the map that it is currently in, the entire entry would be migrated to the next map table, which may require updating the inode entry that points to the map as well.

According to a particular embodiment, each block map 503 contains an array of 16 block pointers. The difference is how the block pointers are interpreted. In a "small files" block map, they would point directly to data blocks (e.g., data blocks 506). For example, a file that contains the data blocks 11, 12, 13, 14, and 15 would use an entry in a "small files" block map that contains 11-15, with the remaining 11 entries zeroed (or, set to the following 11 blocks, if the preallocation scheme described above is used). A "medium" files block map would have pointers to single indirect blocks (e.g., blocks 505 and 507). For example, a file that contains data blocks 1,234 to 5,678 on a 4 k block, 32 bit block pointer file system would have pointers to the indirect blocks controlling 1,234-2,257, 2,258-3,281, 3,282-4,305, 4,305-5,329 and 5,330-5,678.

Migration from a smaller table to a larger table would be triggered when the block map being used could no longer hold all of the data required to find the blocks belonging to a particular file. For example, if the first file (containing blocks 11-15) were to grow to also include the blocks 16-47, its block map would need to be moved. In this case, it would be accompanied by the allocation of an indirect block, which would be filled with pointers to the blocks 11-47. The first entry in the "medium files" block map entry for this file would point to the indirect block. The inode would be updated to point to the new block map and the new entry within that table.

Thus, by removing the block mappings from an inode structure, there are no underutilized fields in the inode structure. The change frees 13 or 14 elements in the i_block array to be reused.

In addition, by moving to more regularized data structures to manage data block mappings, file system performance should improve (especially if in combination of inode allocation schemes described above). Furthermore, going to inode pools, rather than inode tables, an embodiment of the invention solves the problems of too many inodes (which is bad) or too few inodes (which is catastrophic) by allowing the number of inodes to grow and shrink dynamically as demand requires.

Figure 6:
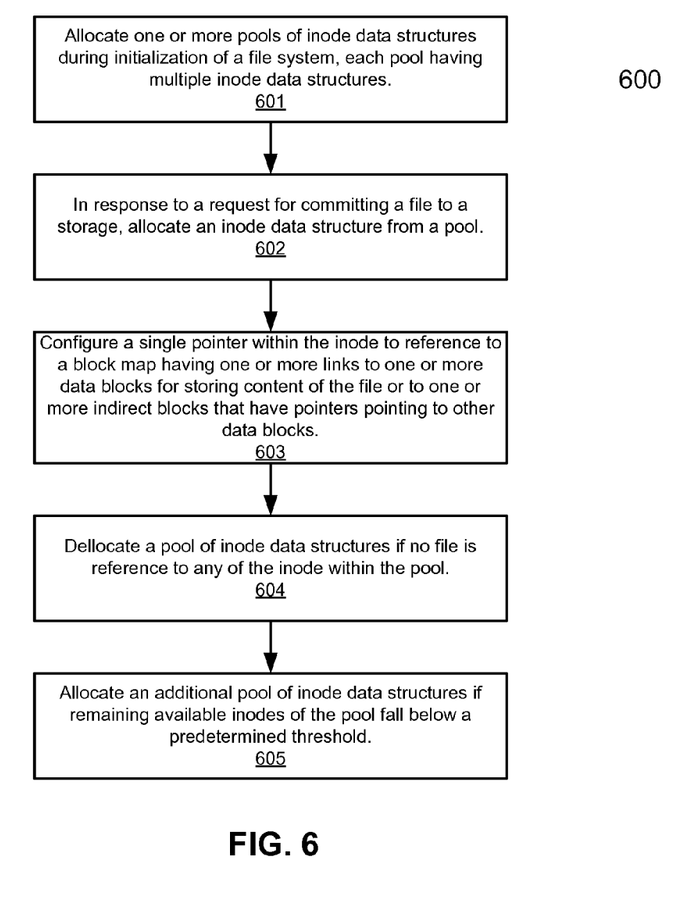
FIG. 6 is a flow diagram illustrating a process for managing inodes of a file system according to one embodiment of the invention.

FIG. 6 is a flow diagram illustrating a process for managing inodes of a file system according to one embodiment of the invention. Note that process 600 may be performed by processing logic which may include software, hardware, or a combination of both. Referring to FIG. 6, at block 601, one or more inode pools are allocated during initialization of a file system, where each inode pool includes multiple inode data structures. In response to a request for committing a file to a storage, an inode data structure is allocated from an inode pool. Within the inode data structure, at block 603, a single pointer is configured to reference to a block map having one or more links to one or more data blocks for storing content of the file. As described above, the block map may be configured according to a size of the file (e.g., small, medium, or large), where the pointers of the block map may reference to another indirect block having pointers to other data blocks or other indirect blocks. When there is no file associated with a particular inode pool, at block 604, that particular inode pool is deallocated. Similarly, when all of the inodes in an inode pool have been used, at block 605, a new inode pool may be allocated dynamically. Other operations may also be performed.

Figure 7:
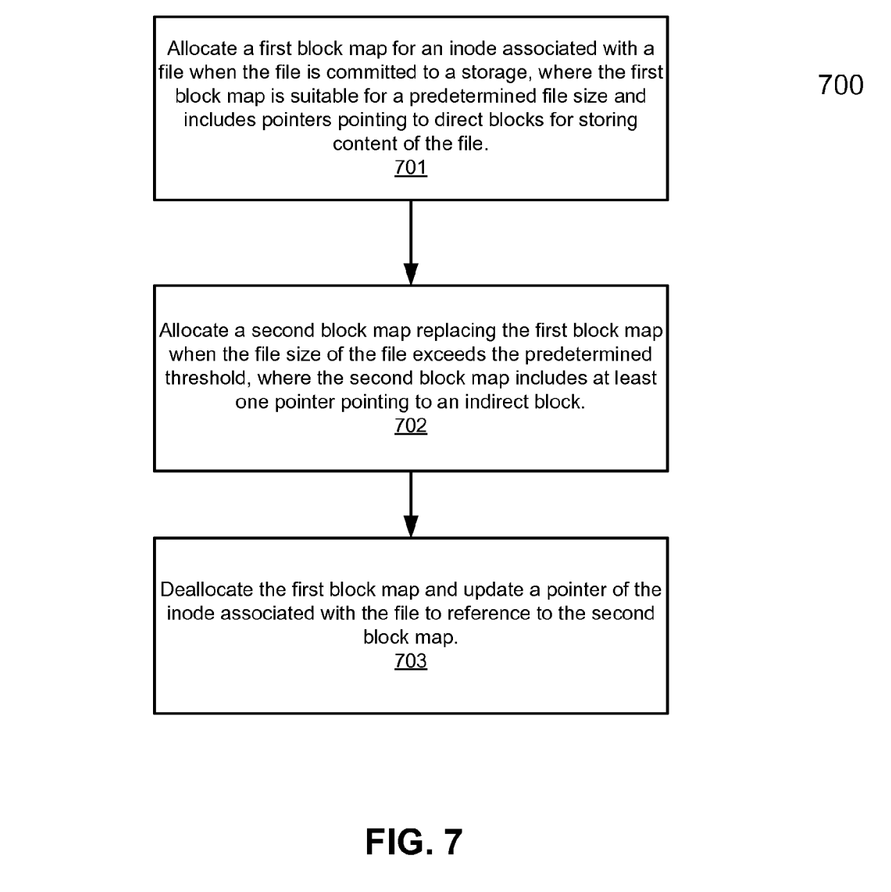
FIG. 7 is a flow diagram illustrating a process for managing inodes of a file system according to another embodiment of the invention.

FIG. 7 is a flow diagram illustrating a process for managing inodes according to another embodiment of the invention. Note that process 700 may be performed by processing logic which may include software, hardware, or a combination of both. Referring to FIG. 7, at block 701, a first block map is allocated for an inode associated with a file to be committed to a storage (e.g., disk). As described above, the first block map may be linked from a single pointer as a data member of the inode (e.g., replacing an i_block array of a conventional inode) and the first block map is suitable for a particular size of the file (e.g., small, medium, or large, etc.) Subsequently, when the file size exceeds a predetermined size associated with the allocated block map, at block 702, a second block map is allocated which includes at least one pointer linking with an indirect block having one or more pointers pointing to one or more data blocks for storing content of the file. Thereafter, at block 703, the first block map is deallocated and the corresponding pointer of the inode is updated now pointing to the second block map. Thus, as the file size gets larger, the corresponding block map is updated while the size of the inode remains the same in which only the value of the pointer is changed, now pointing to a different block map.

Figure 8:
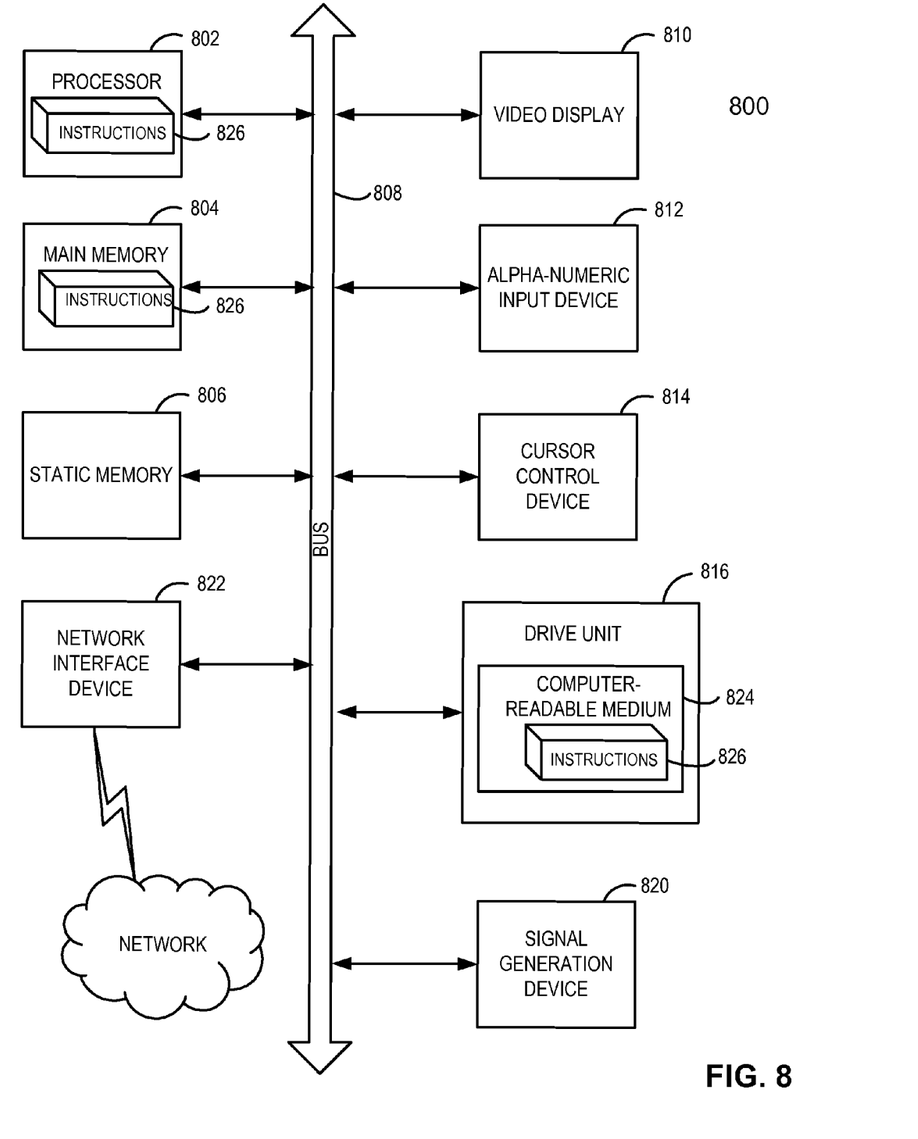
FIG. 8 is a block diagram illustrating an example of a data process system which may be used with one embodiment of the invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 832.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-accessible storage medium 830 (also known as a machine-readable storage medium or a computer-readable medium) on which is stored one or more sets of instructions (e.g., software 822) embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-accessible storage media. The software 822 may further be transmitted or received over a network 820 via the network interface device 808.

While the computer-accessible storage medium 830 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the computer and that cause the machine to perform any one or more of the methodologies of the present invention. The term "computer-accessible storage medium" shall accordingly be taken to include, but not be limited to, solid-state memories, optical and magnetic media, etc.

According to certain embodiments, system 800 may be used to implement a file system described above and to have embodiments of the inventions related inode management described above. For example, file systems described above may be stored in nonvolatile memory and executed in a volatile memory by a processor for accessing a file which may also be stored in the nonvolatile memory (e.g., hard disks), locally or remotely.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer implemented method for managing inodes of a file system, the method comprising:
   allocating a first indirect block comprising a plurality of entries, at least one entry storing a pointer linked with a data block, wherein the first indirect block is referenced by a pointer stored within an inode associated with a file; and
   allocating a first set of contiguous data blocks to be controlled by the first indirect block, the first set of contiguous data blocks comprising a first predetermined number of contiguous data blocks, each referenced by a pointer stored in an entry of the first indirect block, wherein the first set of contiguous data blocks and the first indirect block that controls the first set of contiguous data blocks are contiguous blocks with respect to each other, such that content of the first indirect block and the first set of contiguous data blocks is retrievable from a storage via a single storage access operation.

2. The method of claim 1, wherein the first set of contiguous data blocks are physically and contiguously located immediately after a location associated with the first indirect block.

3. The method of claim 1, further comprising in response to a first byte of the file to be committed to the storage, allocating a second set of data blocks comprising a second predetermined number of contiguous data blocks, wherein the second set of contiguous data blocks are referenced by corresponding pointers stored in the inode of the file.

4. The method of claim 3, wherein content of the second set of contiguous data blocks is retrievable via a single storage access operation.

5. The method of claim 4, wherein the second set of contiguous data blocks are allocated prior to allocating the first set of contiguous data blocks.

6. The method of claim 1, further comprising:
   allocating a second indirect block comprising a plurality of entries, each entry capable of being linked with another indirect block;
   allocating a third indirect block linked with one of the plurality of entries of the second indirect block, the third indirect block comprising a plurality of entries; and
   allocating a third set of contiguous data blocks to be controlled by the third indirect block, each of the third set of contiguous data blocks referenced by an entry of the third indirect block, wherein the third set of contiguous data blocks and the third indirect block that controls the third set of contiguous data blocks are contiguous blocks with respect to each other, such that content of the third indirect block and the third set of contiguous data blocks is retrievable from a storage via a single storage access operation.

7. The method of claim 6, wherein the second and third indirect blocks are contiguous to each other, such that the second and third indirect blocks as well as the third set of contiguous data blocks is retrievable from a storage via a single storage access operation.

8. A computer readable medium including instructions that, when executed by a processing system, cause the processing system to perform a method for managing inodes of a file system, the method comprising:
   allocating a first indirect block comprising a plurality of entries, at least one entry storing a pointer linked with a data block, wherein the first indirect block is referenced by a pointer stored within an inode associated with a file; and
   allocating, by the processing system, a first set of contiguous data blocks to be controlled by the first indirect block, the first set of contiguous data blocks comprising a first predetermined number of contiguous data blocks, each referenced by a pointer stored in an entry of the first indirect block, wherein the first set of contiguous data blocks and the first indirect block that controls the first set of contiguous data blocks are contiguous blocks with respect to each other, such that content of the first indirect block and the first set of contiguous data blocks is retrievable from a storage via a single storage access operation.

9. The computer readable medium of claim 8, wherein the first set of contiguous data blocks are physically and contiguously located immediately after a location associated with the first indirect block.

10. The computer readable medium of claim 8, wherein the method further comprises in response to a first byte of the file to be committed to the storage, allocating a second set of data blocks comprising a second predetermined number of contiguous data blocks, wherein the second set of contiguous data blocks are referenced by corresponding pointers stored in the inode of the file.

11. The computer readable medium of claim 10, wherein content of the second set of contiguous data blocks is retrievable via a single storage access operation.

12. The computer readable medium of claim 11, wherein the second set of contiguous data blocks are allocated prior to allocating the first set of contiguous data blocks.

13. The computer readable medium of claim 8, wherein the method further comprises:
- allocating a second indirect block comprising a plurality of entries, each entry capable of being linked with another indirect block;
- allocating a third indirect block linked with one of the plurality of entries of the second indirect block, the third indirect block comprising a plurality of entries; and
- allocating a third set of contiguous data blocks to be controlled by the third indirect block, each of the third set of contiguous data blocks referenced by an entry of the third indirect block, wherein the third set of contiguous data blocks and the third indirect block that controls the third set of contiguous data blocks are contiguous blocks with respect to each other, such that content of the third indirect block and the third set of contiguous data blocks is retrievable from a storage via a single storage access operation.

14. The computer readable medium of claim 13, wherein the second and third indirect blocks are contiguous to each other, such that the second and third indirect blocks as well as the third set of contiguous data blocks is retrievable from a storage via a single storage access operation.

15. A data processing system, comprising:
- a processing device; and
- a memory for storing instructions, which when executed from the memory, cause the processing device to perform a method, the method including allocating a first indirect block comprising a plurality of entries, at least one entry storing a pointer linked with a data block, wherein the first indirect block is referenced by a pointer stored within an inode associated with a file, and allocating a first set of contiguous data blocks to be controlled by the first indirect block, the first set of contiguous data blocks comprising a first predetermined number of contiguous data blocks, each referenced by a pointer stored in an entry of the first indirect block, wherein the first set of contiguous data blocks and the first indirect block that controls the first set of contiguous data blocks are contiguous blocks with respect to each other, such that content of the first indirect block and the first set of contiguous data blocks is retrievable from a storage via a single storage access operation.

16. The system of claim 15, wherein the first set of contiguous data blocks are physically and contiguously located immediately after a location associated with the first indirect block.

17. The system of claim 15, wherein the method further comprises in response to a first byte of the file to be committed to the storage, allocating a second set of data blocks comprising a second predetermined number of contiguous data blocks, wherein the second set of contiguous data blocks are referenced by corresponding pointers stored in the inode of the file.

18. The system of claim 17, wherein content of the second set of contiguous data blocks is retrievable via a single storage access operation.

19. The system of claim 18, wherein the second set of contiguous data blocks are allocated prior to allocating the first set of data blocks.

20. The system of claim 15, wherein the method further comprises:
- allocating a second indirect block comprising a plurality of entries, each entry capable of being linked with another indirect block;
- allocating a third indirect block linked with one of the plurality of entries of the second indirect block, the third indirect block comprising a plurality of entries; and
- allocating a third set of contiguous data blocks to be controlled by the third indirect block, each of the third set of contiguous data blocks referenced by an entry of the third indirect block, wherein the third set of contiguous data blocks and the third indirect block that controls the third set of contiguous data blocks are contiguous blocks with respect to each other, such that content of the third indirect block and the third set of contiguous data blocks is retrievable from a storage via a single storage access operation.

21. The system of claim 20, wherein the second and third indirect blocks are contiguous to each other, such that the second and third indirect blocks as well as the third set of contiguous data blocks is retrievable from a storage via a single storage access operation.

* * * * *